United States Patent
Young et al.

(10) Patent No.: US 8,238,960 B2
(45) Date of Patent: Aug. 7, 2012

(54) METHOD AND APPARATUS FOR MULTI-TRANSMITTER POWER CONTROL

(75) Inventors: Jason Young, Palm City, FL (US); Roberto Gautier, Davie, FL (US)

(73) Assignee: Motorola Mobility LLC, Libertyville, IL (US)

( * ) Notice: Subject to any disclaimer, the term of this patent is extended or adjusted under 35 U.S.C. 154(b) by 542 days.

(21) Appl. No.: 12/347,294

(22) Filed: Dec. 31, 2008

(65) Prior Publication Data

US 2010/0166048 A1 Jul. 1, 2010

(51) Int. Cl.
*H04B 7/00* (2006.01)
(52) U.S. Cl. ....................................... 455/522
(58) Field of Classification Search .................... 455/552
See application file for complete search history.

(56) References Cited

U.S. PATENT DOCUMENTS 6,748,231 B2 * 6/2004 Pan et al. ...................... 455/518
* cited by examiner

*Primary Examiner* — Lincoln Donovan
*Assistant Examiner* — Daniel Rojas
(74) *Attorney, Agent, or Firm* — Pablo Meles; Sylvia Chen

(57) ABSTRACT

A method (100) in a multi-transmitter mobile device (201) can include transmitting (102) a signal in a first mode causing an interrupting signal to a transmission in a second mode, receiving (104) commands to increase power in the second mode as a result of the interrupting signal, and circumventing (106) the commands to increase power in the second mode when transmitting the signal in the first mode interrupts the signal in the second mode. The method can circumvent commands to increase power by alternating (108) a power control bit up and down and masking a true bit coming from a base station to the multi-transmitter mobile device. In another alternative, the method can circumvent by storing (110) a power control setting prior to the interrupting signal with a stored value, waiting for a removal of the interrupting signal, and overwriting a calculated power control setting with the stored value.

20 Claims, 2 Drawing Sheets

METHOD AND APPARATUS FOR MULTI-TRANSMITTER POWER CONTROL

FIELD

This invention relates generally to communication devices, and more particularly to a method and system of overcoming power control discontinuities.

BACKGROUND

On devices that support multiple transceivers that operate simultaneously and asynchronously, multiple transmitters can be concurrently enabled. When transmitting simultaneously, several issues can arise with respect to Specific Absorption Rate (SAR) increases, battery life degradation and RF pollution increases (spurious emissions of the transmitters). In a code division multiple access (CDMA) system, a CDMA base station commands the CDMA mobile device to increase transmitter power when the CDMA base station fails to detect a signal from the mobile device regardless of how the interruption to the signal is caused. Thus, a CDMA mobile device may unnecessarily increase its power due to a self induced signal interruption.

SUMMARY

Embodiments in accordance with the present invention can provide an apparatus and methods to overcome power discontinuities in multi-transmitter devices.

In a first embodiment of the present invention, a method in a multi-transmitter mobile device can include transmitting a signal in a first mode causing an interrupting signal to a transmission in a second mode, receiving commands to increase power in the second mode as a result of the interrupting signal, and circumventing the commands to increase power in the second mode only when transmitting the signal in the first mode interrupts the signal in the second mode. The method circumvents commands to increase power in the second mode by ignoring the commands to increase power in several ways. In one alternative, the method circumvents commands to increase power by alternating a power control bit up and down and masking a true bit coming from a base station to the multi-transmitter mobile device. In another alternative, the method circumvents commands to increase power by storing a power control setting prior to the interrupting signal with a stored value, waiting for a removal of the interrupting signal, and overwriting a calculated power control setting with the stored value. Note that the interrupting signal and the transmission in the second mode can transmit simultaneously. The transmissions in the first and second modes can be transmissions in any number of protocols. For example, the second mode can be a CDMA signal or GSM signal and the first mode can be a WiMax signal or an iDEN dispatch signal.

In a second embodiment of the present invention, a multi-transmitter mobile device can include a controller operable to simultaneously transmit a signal in a first mode causing an interrupting signal to a transmission in a second mode, receive commands to increase power in the second mode as a result of the interrupting signal, and ignore commands from a base station to increase power in the second mode as a result of the interrupting signal to the transmission in the second mode. The mobile device can operate as described above and can have a controller that ignores commands to increase power by alternating a power control bit up and down and masking a true bit coming from the base station to the multi-transmitter mobile device or alternatively the controller can ignore commands to increase power by storing a power control setting prior to the interrupting signal with a stored value representative of a power control setting prior to the interrupting signal, waiting for a removal of the interrupting signal, and overwriting a calculated power control setting with the stored value.

In a third embodiment, a multi-transmitter mobile device can include a controller operable to simultaneously transmit a signal in a first mode causing an interruption signal to a transmission in a second mode where the second mode is a code division multiple access (CDMA) mode, receive commands to increase power in the second mode as a result of the interruption signal, and ignore commands from a CDMA base station to increase power in the second mode as a result of the interruption signal to the transmission in the second mode. The controller can ignore commands to increase power by alternating a power control bit up and down (every 1.25 milliseconds, for example) and masking a true bit coming from the base station to the multi-transmitter mobile device. The controller can alternatively ignore commands to increase power by storing a power control setting prior to the interrupting signal with a stored value representative of a power control setting prior to the interrupting signal, waiting for a removal of the interrupting signal, and overwriting a calculated power control setting with the stored value.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely.

The terms "circumvent," "ignore," and the like as used herein, can include any number of methods of disregarding or avoiding commands to increase power at a mobile device resulting in no increase or a minimal increase in a power control setting at the mobile device.

Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

Figure 1:
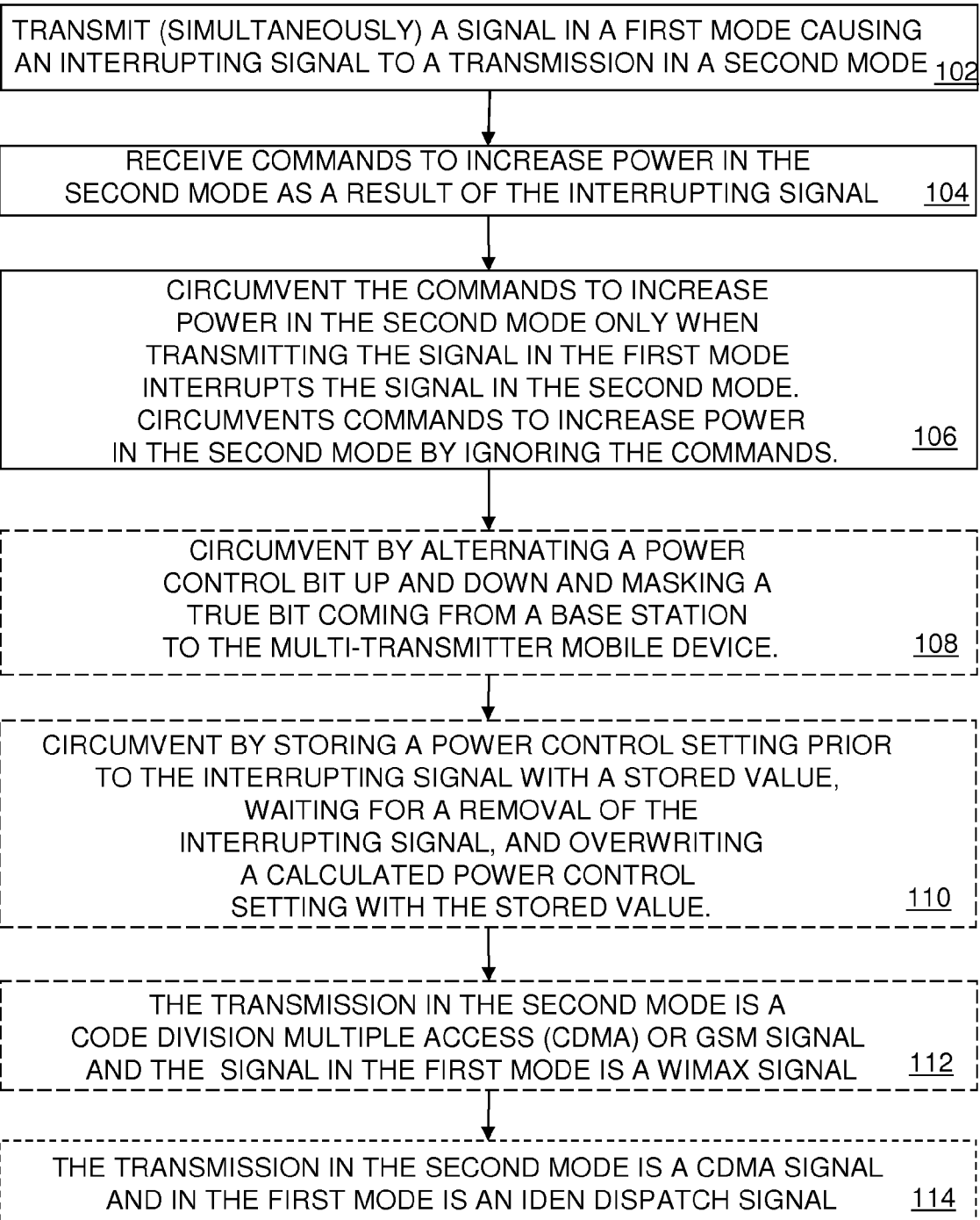
FIG. 1 is a flow chart illustrating a method in accordance with an embodiment of the present invention

While the specification concludes with claims defining the features of embodiments of the invention that are regarded as novel, it is believed that the invention will be better understood from a consideration of the following description in conjunction with the figures, in which like reference numerals are carried forward.

Referring to FIG. 1, a flow chart illustrating a method 100 in a multi-transmitter mobile device. The multi-transmitter device can transmit simultaneously in any number of modes such as CDMA, WiMax, GSM, iDEN or in other wireless protocols as will be further describe below. The method 100 can generally transmit a signal in a first mode causing an interrupting signal to a transmission in a second mode at 102 and receive commands to increase power in the second mode as a result of the interrupting signal at 104. At 106, the method can circumvent the commands to increase power in the second mode only when transmitting the signal in the first mode interrupts the signal in the second mode by ignoring the commands. Circumventing or ignoring the commands to increase power can be done in a number of ways. At 108, the method can circumvent the command to increase power by alternating a power control bit up and down and masking a true bit coming from a base station to the multi-transmitter mobile device. Alternatively, at 110, the method can circumvent the command to increase power by storing a power control setting prior to the interrupting signal with a stored value, waiting for a removal of the interrupting signal, and overwriting a calculated power control setting with the stored value. In one aspect, the transmission in the second mode can be a code division multiple access (CDMA) or GSM signal and the signal in the first mode is a WiMax signal as noted at 112. In another aspect, the transmission in the second mode can be a CDMA signal and the signal in the first mode is an iDEN dispatch signal as noted at 114. Further note that the signal in the first mode (or the interrupting signal) and the signal in the second mode can transmit simultaneously or substantially at the same time.

With more particularity to a CDMA system for the second mode, note that when "holes" are punched in the CDMA transmission, the CDMA base station does not detect a signal from the mobile device. In such circumstances and according to the CDMA protocol, a base stations will typically command the mobile device to increase transmit power (such as by 1 or 2 dB, depending on network configuration) every 1.25 ms. After a 15 ms period, the mobile terminal has received twelve (12) commands to increase transmit power. When the (CDMA) transmitter in the mobile device is re-enabled, the power control setting is now higher than it should be for the given network conditions. The method 100 described above circumvents or ignores the commands to increase power.

A CDMA processor or controller of a mobile device can be interrupted with a line that disables the CDMA transmitter. Upon interruption, the lower level power control code can be modified to ignore the power control bit being received from the base station in at least two possible ways. First, a subroutine can run that alternates the power control bit up and down every 1.25 ms, masking the true bit coming down from a CDMA base station. The net effect will be only one power step away from the original power setting, instead of 12 steps to increase power. A second method as described above would employ a simple algorithm that stores the power control setting prior to the disabling interrupting transmission (by the first mode transmitter) and, after the interrupt is removed, writes over the calculated power control setting with the stored value.

Figure 2:
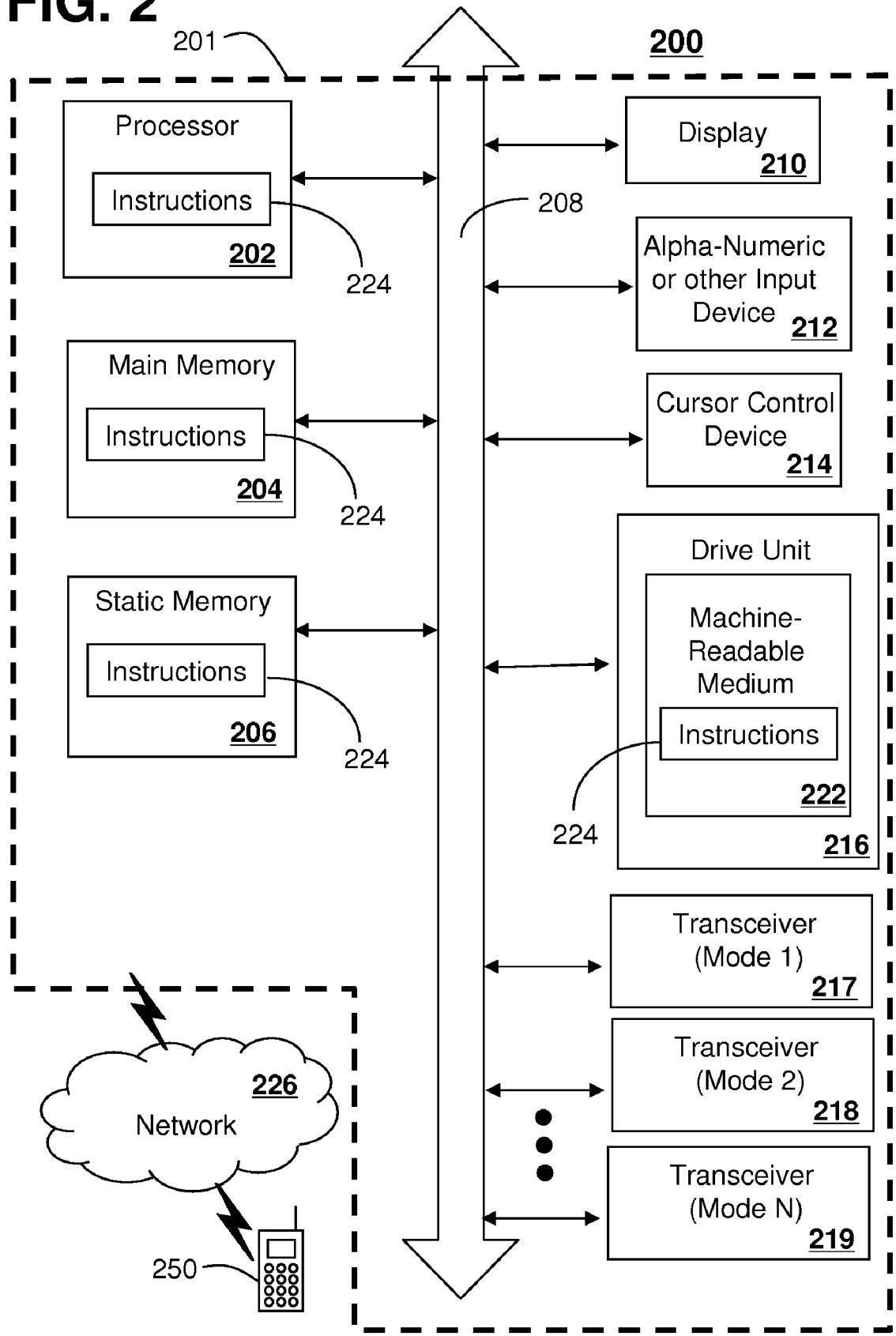
FIG. 2 is an illustration of a mobile device in accordance with an embodiment of the present invention.

In another embodiment of the present invention as illustrated in the diagrammatic representation of FIG. 2, an electronic product 201 such as a machine having a display 210 can include a processor or controller 202 coupled to the display. The device 201 can be a hand-held device selected among a cellular phone, a personal digital assistant, a smart phone, an MP3 Player, a music player, a remote controller, a wrist-worn computer, and a watch for example. Generally, in various embodiments it can be thought of as a machine in the form of a computer system 200 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 201 and a sending device 250 or vice-versa.

The machine may comprise a server computer, a client user computer, a personal computer (PC), a tablet PC, personal digital assistant, a cellular phone, a laptop computer, a desktop computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication or presentations. Further, while a single machine is illustrated, the term "machine" shall also be taken to include any collection of machines that individually or jointly execute a set (or multiple sets) of instructions to perform any one or more of the methodologies discussed herein.

The computer system 200 can include a controller or processor 202 (e.g., a central processing unit (CPU), a graphics processing unit (GPU, or both), a main memory 204 and a static memory 206, which communicate with each other via a bus 208. The computer system 200 may further include a presentation device such the display 210. The computer system 200 may include an input device 212 (e.g., a keyboard, microphone, etc.), a cursor control device 214 (e.g., a mouse), a disk drive unit 216, a plurality of transceivers (217, 218, and 219) that can transmit (and receive) signals in different modes simultaneously or substantially simultaneously. For example, the transceiver 217 can include an iDEN transmitter, the transceiver 218 can include a CDMA transmitter, and the transceiver 219 can include a WiMax transmitter. The mode of transmitter is not necessarily limited to these modes or the order described as long as a first mode interrupts the signal of a second mode transmission and any power control instructions to the second mode is circumvented or ignored as a result of the interrupting first mode transmission. Of course, in the embodiments disclosed, many of these items described above are optional.

The disk drive unit 216 may include a machine-readable medium 222 on which is stored one or more sets of instructions (e.g., software 224) embodying any one or more of the methodologies or functions described herein, including those methods illustrated above. The instructions 224 may also reside, completely or at least partially, within the main memory 204, the static memory 206, and/or within the processor or controller 202 during execution thereof by the computer system 200. The main memory 204 and the processor or controller 202 also may constitute machine-readable media.

Dedicated hardware implementations including, but not limited to, application specific integrated circuits, programmable logic arrays, FPGAs and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing can also be constructed to implement the methods described herein. Further note, implementations can also include neural network implementations, and ad hoc or mesh network implementations between communication devices.

The present disclosure contemplates a machine readable medium containing instructions 224, or that which receives and executes instructions 224 from a propagated signal so that a device connected to a network environment 226 can send or receive voice, video or data, and to communicate over the network 226 using the instructions 224. The instructions 224 may further be transmitted or received over a network 226 via one of the transceivers (217, 218 and/or 219).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

In light of the foregoing description, it should be recognized that embodiments in accordance with the present invention can be realized in hardware, software, or a combination of hardware and software if software is use to control or detect physical connections or distances between certain claimed elements that can provide variation in antenna characteristics or performance. It should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method in a multi-transmitter mobile device, comprising:
   transmitting, by the multi-transmitter mobile device, a second signal in a second mode;
   transmitting, by the multi-transmitter mobile device, a first signal in a first mode that creates an interrupting signal to the second signal;
   receiving a command to increase power in the second mode as a result of the interrupting signal; and
   circumventing the command to increase power in the second mode only when transmitting the first signal in the first mode interrupts the second signal in the second mode.

2. The method of claim 1, wherein the method circumvents commands to increase power in the second mode by ignoring the commands.

3. The method of claim 1, wherein the method circumvents commands to increase power by alternating a power control bit up and down and masking a true bit coming from a base station to the multi-transmitter mobile device.

4. The method of claim 1, wherein the method circumvents commands to increase power by storing a power control setting prior to the interrupting signal with a stored value, waiting for a removal of the interrupting signal, and overwriting a calculated power control setting with the stored value.

5. The method of claim 1, wherein the interrupting signal and the transmission in the second mode transmit simultaneously.

6. The method of claim 1, wherein the transmission in the second mode is a code division multiple access (CDMA) signal and the signal in the first mode is a WiMax signal.

7. The method of claim 1, wherein the transmission in the second mode is a GSM signal and the signal in the first mode is a WiMax signal.

8. The method of claim 1, wherein the transmission in the second mode is a code division multiple access signal and the signal in the first mode is an iDEN dispatch signal.

9. A multi-transmitter mobile device, comprising:
   a controller operable to:
      transmit a second signal in a second mode;
      transmit a first signal in a first mode that creates an interrupting signal to the second signal;
      receive a command from a base station to increase power in the second mode as a result of the interrupting signal; and
      ignore the command from the base station to increase power in the second mode as a result of the interrupting signal.

10. The multi-transmitter mobile device of claim 9, wherein the controller ignores commands to increase power by alternating a power control bit up and down and masking a true bit coming from the base station to the multi-transmitter mobile device.

11. The multi-transmitter mobile device of claim 9, wherein the controller ignores commands to increase power by storing a power control setting prior to the interrupting signal with a stored value representative of a power control setting prior to the interrupting signal, waiting for a removal of the interrupting signal, and overwriting a calculated power control setting with the stored value.

12. The multi-transmitter mobile device of claim 9, wherein the transmission in the second mode is a code division multiple access signal and the signal in the first mode is a WiMax signal.

13. The multi-transmitter mobile device of claim 9, wherein the transmission in the second mode is a GSM signal and the signal in the first mode is a WiMax signal.

14. The multi-transmitter mobile device of claim 9, wherein the transmission in the second mode is a code division multiple access signal and the signal in the first mode is an iDEN dispatch signal.

15. The multi-transmitter mobile device of claim 9, wherein the second mode is a code division multiple access (CDMA) signal and the controller ignores commands to increase power by alternating a power control bit up and down every 1.25 milliseconds and masking a true bit coming from the base station to the multi-transmitter mobile device.

16. A multi-transmitter mobile device, comprising:
   a plurality of transceivers;
   at least one receiver;
   a controller coupled to the plurality of transceivers and the at least one receiver, wherein the controller is operable to:
      transmit a second signal in a second mode, wherein the second mode is a code division multiple access (CDMA) mode;
      transmit a first signal in a first mode that creates an interruption signal to the second signal;
      receive a commands to increase power in the second mode as a result of the interruption signal; and ignore the commands from a CDMA base station to increase power in the second mode as a result of the interruption signal.

17. The multi-transmitter mobile device of claim 16, wherein the controller ignores commands to increase power by alternating a power control bit up and down and masking a true bit coming from the base station to the multi-transmitter mobile device.

18. The multi-transmitter mobile device of claim 16, wherein the controller ignores commands to increase power by alternating a power control bit up and down every 1.25 milliseconds and masking a true bit coming from the base station to the multi-transmitter mobile device.

19. The multi-transmitter mobile device of claim 16, wherein the controller ignores commands to increase power by storing a power control setting prior to the interrupting signal with a stored value representative of a power control setting prior to the interrupting signal, waiting for a removal of the interrupting signal, and overwriting a calculated power control setting with the stored value.

20. The multi-transmitter mobile device of claim 16, wherein the transmission in the first mode is a WiMax signal or an iDEN dispatch signal.

* * * * *